Sept. 8, 1936.   F. M. VANDERVOORT   2,053,542
LUBRICATING MEANS FOR CHANGE SPEED MECHANISMS
Filed April 11, 1934
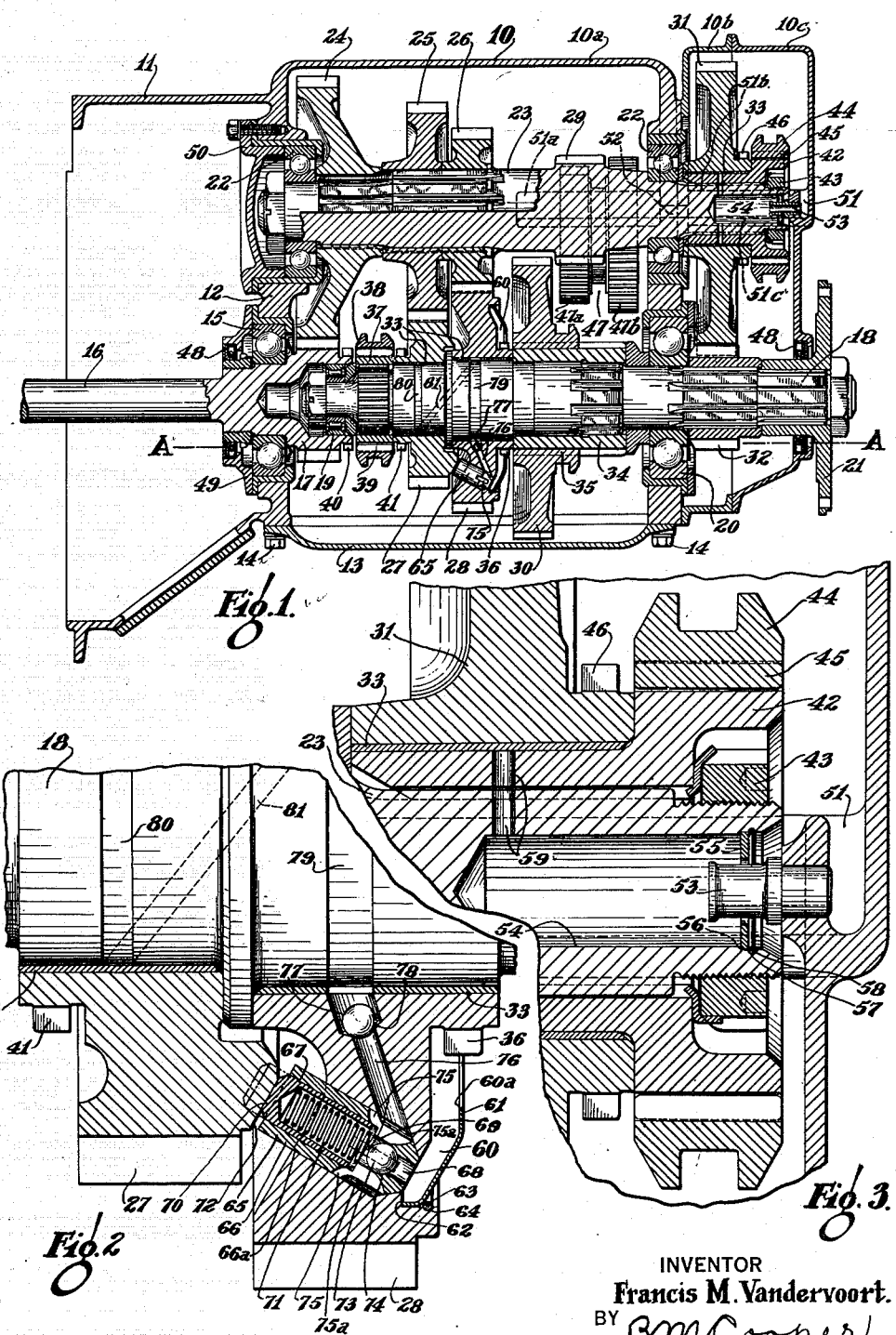
INVENTOR
Francis M. Vandervoort.
BY R M Cooper
ATTORNEY Patented Sept. 8, 1936

2,053,542

UNITED STATES PATENT OFFICE 2,053,542

LUBRICATING MEANS FOR CHANGE SPEED MECHANISMS

Francis M. Vandervoort, Cleveland, Ohio, assignor to The White Motor Company, Cleveland, Ohio, a corporation of Ohio Application April 11, 1934, Serial No. 720,081

6 Claims. (Cl. 184—11)

This invention relates to change speed mechanisms, and has for its primary object the provision of simple and efficient means for lubricating the bearing surfaces of mechanisms of the type specified.

Other objects will appear in the following description when read in connection with the accompanying drawing, in which:

Figure 1 is a longitudinal section of an automobile transmission embodying the present invention, and Figures 2 and 3 are enlarged views of portions of the mechanism illustrated in Figure 1.

The transmission illustrated in the drawing comprises a casing 10 consisting of three sections 10a, 10b and 10c secured together by means of bolts and studs, not shown. The main section 10a is constructed with an end portion 11 designed to join with a bell shaped flange on the automobile engine employed with the transmission, and to form with such flange a housing for the engine flywheel and associated mechanism. Such section is further constructed with a transverse web 12 which forms the forward wall of the gear enclosing portion of the section, and with an opening in its lower wall designed for the insertion of internal parts and normally closed by a cover plate 13 secured in place by cap screws 14.

Extending into the forward end of the section 10a and supported in a bearing 15 mounted in the web 12, there is a driving shaft 16, which in assembly of the transmission with the engine employed therewith, is connected to a clutch mechanism for establishing a driving connection between it and the engine. The inner end of the shaft 16 is formed with an integral gear 17 which is axially bored to receive the end of an aligned driven shaft 18 which extends through the rear wall of the section 10c. The driven shaft 18 is supported at its forward end within the gear 17 by means of a roller bearing 19, and at its rear end is supported within an aperture in the rear end wall of the section 10a by means of a ball bearing 20. Secured upon the rear end of the driven shaft 18, there is a flange member 21 through which such shaft is connected with the driving mechanism of the automobile within which the transmission is installed.

Mounted above the driven shaft 18 and supported in ball bearings 22 mounted in the web 12 and the rear wall of the section 10a, there is a countershaft 23 which extends through the rear wall of the section 10a into the compartment formed by the sections 10b and 10c. Fixed on the forward end of the countershaft 23 are three gears 24, 25 and 26 which mesh respectively with the gear 17 on the driving shaft 16 and with two gears 27 and 28 rotatably mounted on the driven shaft 18; and integrally formed on the countershaft 23 adjacent the rear wall of the section 10a, there is a gear 29 designed for meshing engagement with a gear 30 slidably and non-rotatably mounted upon the driven shaft 18. Rotatably mounted on the rear end of the countershaft 23 within the compartment formed by the sections 10b and 10c there is a gear 31 which meshes with a gear 32 fixed on the driven shaft. The rotatably mounted gears 27, 28 and 31 are equipped with bearing bushings 33 pressed into place and forming a rigid part of the gears.

The gear 30 is mounted upon the driven shaft 18 through the instrumentality of a splined sleeve 34, and is formed with internal splines 35 designed for interlocking engagement with teeth 36 formed on the gear 28; and splined upon a sleeve 37 non-rotatably mounted upon the forward end of the driven shaft 18, there is a clutch member 38 the inner splined teeth 39 of which are designed for engagement with teeth 40 formed on the gear 17 and with teeth 41 formed on the gear 27. The gear 31 is secured in place by a member 42 splined on the end of the countershaft and held against rearward movement by a nut 43; and slidably and non-rotatably mounted upon the enlarged outer end portion of the member 42 by means of splined engagement therewith, there is a clutch member 44 the splined teeth 45 of which are designed for engagement with the teeth 46 formed on the gear 31.

Slidably and rotatably mounted upon a shaft located at one side of the countershaft 23, there is an integrally formed gear set 47 consisting of two gears 47a and 47b. This gear set is so constructed and arranged that it can be moved from the position shown in the drawing to a position in which the gears 47a and 47b thereof are brought into engagement with the gears 30 and 29 on the driven shaft and countershaft.

Assuming that in each instance the clutch members 38 and 44 and the gear 30 initially occupy the positions shown, five forward speeds and a single reverse speed are obtained as follows:

First speed, by shifting the gear 30 in a rearward direction to bring it into a position with its teeth in mesh with the teeth of the gear 29, the resulting drive being through gears 17, 24, 29 and 30.

Second speed, by shifting the gear 30 in a forward direction to bring its internal splined teeth 35 into engagement with the teeth 36 on the gear 28, the resulting drive being through gears 17, 24, 26 and 28.

Third speed, by shifting the clutch member 38 in a rearward direction to bring its splined teeth 39 into engagement with the teeth 41 on the gear 27, the resulting drive being through gears 17, 24, 25 and 27.

Fourth speed or direct drive, by shifting the clutch member 38 in a forward direction to bring its splined teeth 39 into engagement with the teeth 40 on the gear 17.

Fifth speed, by shifting the clutch member 44 in a forward direction to bring its splined teeth 45 into engagement with the teeth 46 on the gear 31, the resulting drive being through gears 17, 24, 31 and 32, and Reverse, by shifting the gear set 47 in a forward direction to bring the gears 47a and 47b thereof into engagement with the gears 30 and 29, the resulting drive being through gears 17, 24, 29, 47b, 47a and 30.

The lower portion of the transmission casing 10 serves as a lubricant reservoir, the normal height of the lubricant being indicated in Figure 1 by the line A—A. The escape of lubricant about the shafts 18 and 16 is prevented by suitable sealing means 48 mounted in the rear wall of the casing 10c, and in a cap 49 which forms the forward part of the retaining cage for the bearing 15. The escape of lubricant through the bearing 22 is prevented by constructing the retaining cage for such bearing with a cap 50 which closes the forward side of the bearing. Lubricant flow between the portions of the lubricant reservoir contained in the section 10a and in the compartment formed by the sections 10b and 10c is permitted by way of the bearing 20.

In operation of the transmission, lubricant is carried and thrown up from the reservoir just described by the action of the gears of the transmission into the upper part of the casing 10, from where it flows back into the reservoir. The circulation of lubricant thus produced effects efficient lubrication of all of the wearing surfaces of the transmission except the bearing surfaces for the gears 27, 28 and 31. Means for delivering an adequate supply of lubricant to the bearing surfaces of the gears 27, 28 and 31 is provided in the form of two direct-feed lubricating systems, one for supplying lubricant to the wearing surfaces between the gear 31 and the member 42, and the other for supplying lubricant to the wearing surfaces between the gears 27 and 28 and the driven shaft 18.

The system for supplying lubricant to the wearing surfaces between the gear 31 and the member 42 comprises a trough 51 located in the upper part of the transmission casing in a position to receive a part of the lubricant carried up by the gears of the transmission, such trough consisting of three sections, a section 51a formed on the side wall of the section 10a of the transmission casing, a second section 51b formed on the side wall of the section 10b of the transmission casing and communicating with the section 51a through an aperture 52 formed in the adjoining wall of the sections 10a and 10b, and a third section 51c formed on the side wall and end wall of the section 10c of the transmission casing and forming a continuation of the section 51b. Mounted in the forward wall of the section 51c of the trough 51 and communicating with the interior thereof, there is a nozzle member 53 which extends into a bore 54 formed in the end of the countershaft 23. The bore 54 is partially closed at its rear end by a disc member 55 mounted in circumambient relation to the nozzle 53 and held in place between a shoulder 56 and a snap ring 57 mounted in a groove 58. The rear end of the bore 54 communicates with radially extending ducts 59 leading through the shaft 23 and the member 42 to the wearing surfaces of the gear 31 and the member 42.

In operation of the transmission, lubricant is delivered into the trough 51 from the reservoir in the lower part of the transmission casing 10 by the action of the gears of the transmission. From the trough 51 the lubricant flows through the nozzle 53 into the bore 54 in the end of the countershaft 23, the ring 55 serving to prevent its escape. From the bore 54 the lubricant flows through the ducts 59 onto the wearing surfaces of the gear 31 and the member 42 assisted by centrifugal force.

The lubricating system for supplying lubricant to the wearing surfaces of the gears 27 and 28 and the driving shaft 18 comprises a trough 60 on the side of the gear 28 designed to communicate with the reservoir in the bottom of the casing 10. Such trough is constructed on the side of the gear 28 by means of a flanged disc member 61 secured in place upon the gear 28 between a shoulder 62 and a snap ring 63 mounted in a groove 64, the construction being such that the edge 60a of the trough defines a circle concentric to the gear 28 and of a diameter to extend below the lubricant level in the reservoir.

Embodied in the gear 28, there is a force pump generally indicated by the numeral 65 designed to draw lubricant from the trough 60 and deliver it through a system of conduits hereafter described to the wearing surfaces of the gears 27 and 28 and the driving shaft 18. The pump 65 comprises a cylindrical member 66 mounted in an inclined bore 66a in the gear 28, which is formed with three internal bores of different sizes, a large bore 67 extending from the outer end of the member to a point adjacent its inner end, a small bore 68 in the extreme inner end of the member, and a bore 69 of intermediate size connecting the small bore 68 with the large bore 67. Mounted within the large bore of the member 66, there is a plunger 70 which is urged outward by a spring 71 against a cam 72 formed on the gear 27; and mounted in the bore 69 of the member 66, there is a ball valve 73 provided with a seat 74 at the junction of the bores 68 and 69. The small bore 68 serves as the inlet passage of the pump, and the ball valve 73 as the inlet valve. The bore 69 communicates through slots 75 in the member 66 with a channel 75a formed between the reduced inner end of the member 66 and the bore 66a in the gear 28. The channel 75a communicates with a duct 76 in the gear 28 which leads to the wearing surface of the gear 28 and constitutes the outlet passage of the pump. The outer end of the duct 76 is enlarged, and mounted in the enlarged end there is a ball valve 77 provided with a seat 78 which constitutes the outlet valve of the pump.

The system of conduits for conveying lubricant from the pump 65 to the wearing surfaces of the gears 27 and 28 and the shaft 18 comprises a circular groove 79 formed in the shaft 18 intermediate the sides of the gear 28 and communicating with the inner end of the conduit 76, a second circular groove 80 formed in the shaft 18 midway between the sides of the gear 27, and a drilled hole 81 in the shaft 18 which connects the grooves 79 and 80.

In operation of the transmission, the countershaft 23 is constantly driven from the driving shaft 16 through the gears 17 and 24, and the gears 27 and 28 constantly driven from the countershaft by the gears 25 and 26. For all driving speeds of the transmission, the gear 28 is driven at speeds such that the centrifugal force imposed upon the lubricant within the trough 60 is sufficient to spread the lubricant about the circumference of the trough; and since the lower portion of the trough is maintained filled with lubricant from the reservoir, a substantial depth of oil is developed and maintained in the upper portion of the trough with the result that the inlet of the pump 65 is in communication with a supply of lubricant for all positions of the gear 28. The gear 27 is driven at a greater speed of rotation than the gear 28 with the result that the cam 72 causes reciprocation of the plunger 70. The reciprocation of the plunger 70 thus produced acts to draw lubricant from the trough 60 through the bore 68, and to force the same through the duct 76 and the groove 79 onto the associated bearing surfaces of the gear 28 and the shaft 18, and through the drilled hole 81 and the groove 80 onto the associated bearing surfaces of the gear 27 and the shaft 18. In effecting the delivery of oil from the trough 60 onto the wearing surfaces of the gears 27 and 28 and the associated surfaces of the shaft 18 as described, the ball valves 73 and 77, which are urged toward their seats by centrifugal force act as follows, the ball 73 to prevent the lubricant drawn into the bores 69 and 67 by the outward stroke of the plunger from being expelled through the bore 68 by the inward stroke of the plunger, and the ball 77 to prevent the lubricant forced through the duct 76 by the inward stroke of the plunger from being drawn back into the bores 69 and 67 by outward movement of the plunger.

Although the foregoing description is necessarily of a detailed character, in order that the invention may be completely set forth, it is to be understood that the specific terminology is not intended to be restrictive or confining, and that various rearrangements of parts and structural details may be resorted to without departing from the scope and spirit of the invention as herein claimed.

What I claim is:

1. The combination of a housing constructed with a lubricant reservoir, a shaft mounted in said housing, a gear rotatably mounted on said shaft and extending into the aforesaid reservoir, a second gear mounted on said shaft, a cam associated with said second gear, pump mechanism embodied in said first named gear including a cylinder, a plunger mounted for reciprocation within said cylinder and arranged to bear on said cam, a spring secured in said cylinder urging said plunger against said cam, an inlet conduit leading from the exterior of said gear into said cylinder, an outlet conduit leading from said cylinder to the bearing between said first named gear and said shaft, an inlet valve associated with said inlet conduits and an outlet valve associated with said outlet conduit, and a trough on said gear opening towards the center of the gear, the construction of said trough being such that it communicates with the aforesaid inlet conduit and further being such that its inner edge extends below the lubricant level in said reservoir.

2. The combination of a housing constructed with a lubricant reservoir, a shaft mounted in said housing, a gear rotatably mounted on said shaft and extending into the aforesaid reservoir, a force feed pump embodied in said gear designed and arranged to draw oil from said reservoir and deliver it to the bearing between said gear and said shaft, and means for causing operation of said pump during rotation of said gear.

3. The combination of a housing constructed with a lubricant reservoir, a shaft mounted in said housing, a gear rotatably mounted on said shaft and extending into the aforesaid reservoir, a trough on said gear opening towards the center of said gear and constructed in such a manner that its inner end extends below the lubricant level in said reservoir, a force feed pump embodied in said gear comprising an inlet conduit leading from said pump to the exterior of said gear and communicating with the interior of said trough, and an outlet conduit leading from said pump to the bearing between said gear and said shaft, and means for causing operation of said pump during rotation of said gear.

4. The combination of a housing constructed with a lubricant reservoir, a shaft mounted in said housing, a gear rotatably mounted on said shaft and extending into the aforesaid reservoir, a force feed pump embodied in said gear designed and arranged to draw oil from said reservoir and deliver it to the bearing between said gear and said shaft, said pump comprising a cylinder, a plunger mounted for reciprocation in said cylinder, a spring secured in said cylinder arranged to move said plunger in one direction, an outlet conduit leading from said cylinder to the bearing between said gear and said shaft, and an inlet conduit leading from said cylinder to the exterior of said gear, and cam means located adjacent said gear for causing reciprocation of said plunger during rotation of said gear.

5. The combination of a housing constructed with a lubricant reservoir, a shaft mounted in said housing, a gear rotatably mounted on said shaft and extending into the aforesaid reservoir, a trough on said gear opening towards the center of said gear and constructed in such a manner that its inner end extends below the lubricant level in said reservoir, a force feed pump embodied in said gear comprising a cylinder, a plunger mounted for reciprocation in said cylinder, a spring secured in said cylinder arranged to move said plunger in one direction, an inlet conduit leading from said cylinder to the exterior of said gear and communicating with the interior of said trough, and an outlet conduit leading from said cylinder to the bearing between said gear and said shaft, and cam means located adjacent said gear for causing reciprocation of said plunger during rotation of said gear.

6. The combination of a housing constructed with a lubricant reservoir, a shaft mounted in said housing, a gear rotatably mounted on said shaft and extending into the aforesaid reservoir, a second gear mounted on said shaft, means for driving said first named gear and said second gear at a different rate of rotation, a cam associated with said second gear, and a pump carried by said first named gear designed for operation by said cam, and constructed and arranged to draw oil from said reservoir and to deliver it to the bearing between said gear and said shaft, said pump comprising a cylinder, a plunger mounted for reciprocation within said cylinder and arranged to be actuated by the aforesaid cam on said second gear, a spring mounted in said cylinder arranged to urge said plunger against said cam, an outlet conduit leading from said cylinder to the bearing between said first named gear and said shaft, and an inlet conduit leading from said cylinder to the exterior of said first named gear.

FRANCIS M. VANDERVOORT.